Figure 3:
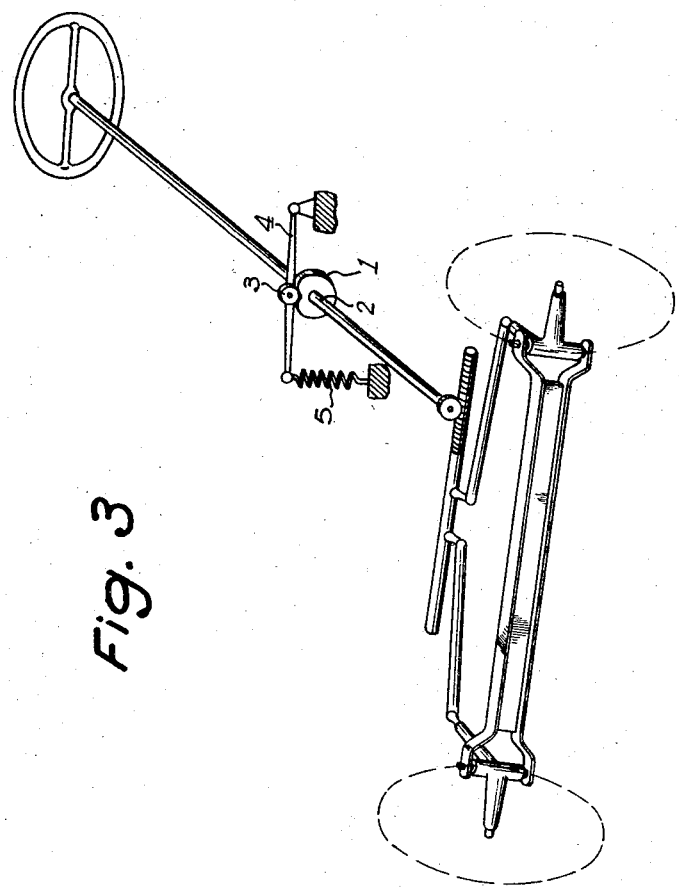

Dec. 2, 1958 A. BRUEDER 2,862,722
CENTERING DEVICE FOR STEERING AUTOMOTIVE VEHICLES
Filed March 6, 1956 2 Sheets-Sheet 1
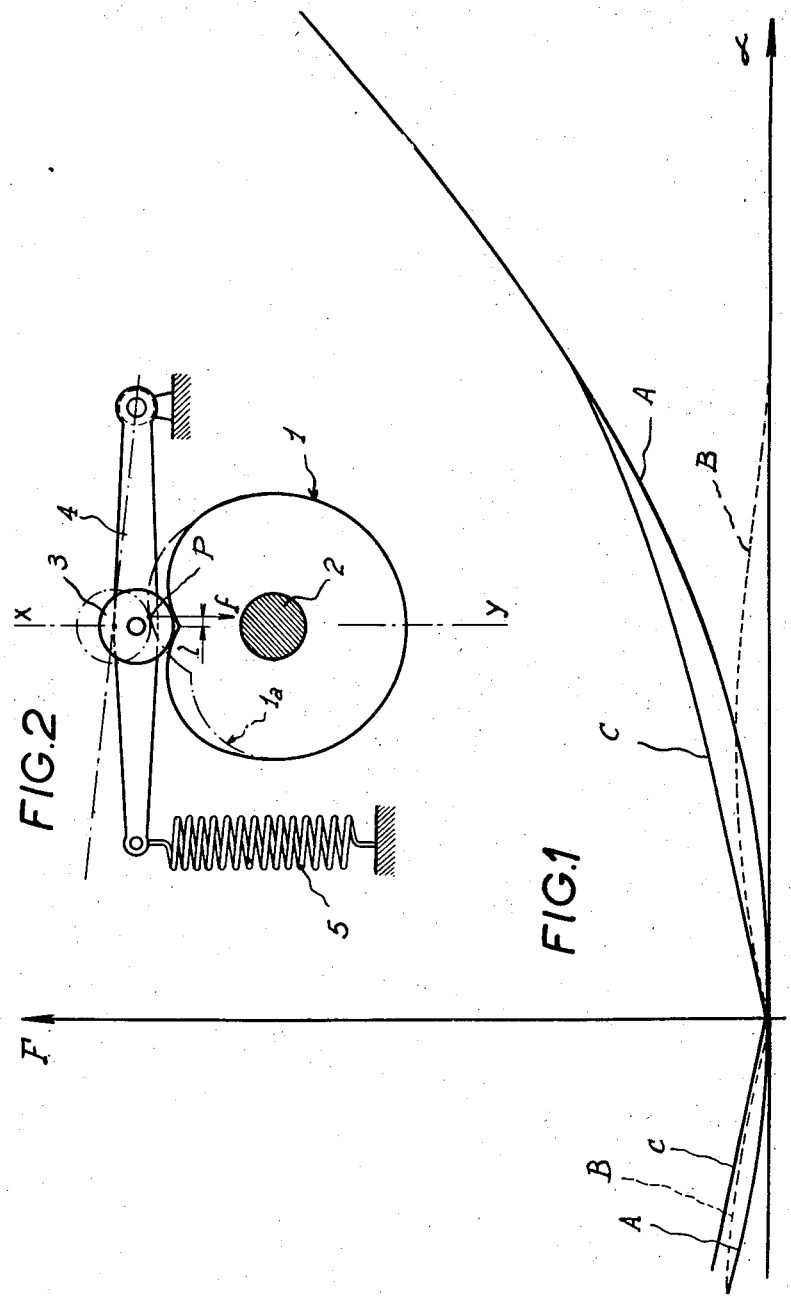

Dec. 2, 1958   A. BRUEDER   2,862,722
CENTERING DEVICE FOR STEERING AUTOMOTIVE VEHICLES
Filed March 6, 1956   2 Sheets-Sheet 2

United States Patent Office 2,862,722
Patented Dec. 2, 1958

2,862,722

CENTERING DEVICE FOR STEERING AUTOMOTIVE VEHICLES

Antoine Brueder, Paris, France, assignor to Societe Anonyme Andre Citroen, Paris, France Application March 6, 1956, Serial No. 569,915

Claims priority, application France March 10, 1955

1 Claim. (Cl. 280—94)

It is currently the trend to reduce the effort required in operating the steering wheel of automotive vehicles. All possible means are used to reduce the friction forces in the linkage and bring the restoring force on the tires down to a strict minimum. The more complete solutions in this trend towards reducing exertion resort to power steering devices.

Such steering systems are very pleasant on winding roads, in towns, or in parking manoeuvers; in straight driving however and especially at high speed it is difficult to keep the steering wheel in a fixed position, since at very low angular displacements the effort to be developed is extremely low; there is no feeling, no reaction at all to indicate to the driver that the wheels are in a plane parallel to the longitudinal axis of the car. The least jolt of the car or the slightest unbalance between the efforts exerted by the driver's hands on the steering wheel, will deflect the latter by a very small angle, yet sufficient for the wheels to obey the urge. This results in a continual corrective action on the driver's part, which in the course of time is effected in an automatic manner, but which nonetheless is objectionable.

In order to overcome this drawback, it has been suggested to provide the steering system with springs exerting a restoring force from either side of straight alignment. The restoring force however then increases with the amplitude of wheel deflection and renders steering substantially more fatiguing as the steering angle increases.

The present invention has for its object a steering device for an automotive vehicle, so improved as to overcome the above stated difficulty while retaining steering flexibility.

According to the invention, the steering device comprises means for developing, from either side of the aligned position, a complementary restoring force which is reduced substantially to zero as the wheel deflection becomes such that the natural restoring moment on the steerable wheels becomes perceptible to the driver.

There is in this way obtained a perceptible reaction even at the slightest deflection of the steering wheel, while on the other hand said reaction, since it quickly drops to zero, does not increase steering "hardness."

In order to achieve this restoring force, there may for example be provided a cam mounted on one of the rotatable parts of the steering system and engaged by a roller mounted on a rocking lever subjected to spring action.

The cam is preferably secured to the steering wheel shaft; in fact experience has shown that it is in such case that the driver will best feel the resilient reaction determined by the contour of the cam and the roller actuating spring.

One form of embodiment of the invention has been described hereinafter by way of a nonrestrictive example, with reference to the accompanying drawing wherein:

Fig. 1 illustrates various diagrams where force is plotted as a function of steering angle;

Fig. 2 diagrammatically illustrates an arrangement for providing the additional restoring force; and Fig. 3 is a perspective view illustrating the installation of the arrangement of Fig. 2 in a conventional steering system.

In Fig. 1, the curve A represents the variations of the normal restoring force F on the steerable wheels (during the initial stage of deflection) as a function of the steering angle $\alpha$. It will be seen that this force F is very low when the steering angle is small.

According to the invention, the steering system is provided with means developing an additional restoring force the variations of which are represented by curve B and which drops to zero when the force F is large enough; such additional force may be zero at the start, as shown, or may not.

The curve C shows the variation of the total restoring force with steering angle.

In Fig. 2 there is shown a restoring radial cam 1, which is secured to the steering shaft 2 of a conventional steering control system which has a steering wheel thereon and which serves to turn steerable vehicle wheels (shown in broken lines) by way of a worm and worm wheel transmission, all as shown in Fig. 3. As is apparent in Fig. 2, the radial cam 1 has a single ceratoid cusp. A roller 3 mounted on a rocking lever 4 is applied against the periphery of cam 1 by a spring 5. The cam is shown in its centered position wherein the force exerted by the roller on the cam, passes through the center of the ceratoid cusp of the cam 1 and through the axis of the latter. As the steering shaft 2 is rotated, the cam 1 assumes a certain position with respect to the roller, e. g. the position shown in chain lines 1$a$. In this position the pressure force $f$ depending on the tension of spring 5, has its point of application $p$ displaced from the center line X—Y an amount $l$, thereby creating a restoring moment $F=f.l$ represented by the curve B of Fig. 1.

In practice, the cam is only active over about one quarter turn to either side of its centered position; and thus, the ceratoid cusp consists of two symmetrical sections which are outwardly convex and meet at the center, each of such sections extending over approximately one quarter of the periphery of the cam and having radius vectors progressively decreasing throughout the length of the section in the direction toward the center of the cusp. Over the remaining 180° the contour consists of a circular arc concentric with the shaft 2; so that, when roller 3 engages such circular arc, the artificial restoring force is then zero. It will be noted therefore that, for a steering wheel rotation greater than 270°, the cam contour will disturb the curve for the natural restoring force on the steerable wheels. At that time however, the additional restoring force is so very small comparatively to the natural restoring force, that it is impossible to notice such disturbance during normal manoeuvers. Moreover, it is possible, if necessary, to design a cam wherein the camway is helical so as to prevent the roller 3 from dropping at each turn of the steering wheels 2 into the active portion of the cam; in such case the contour of the different turns of the camway, except the first, will be circular.

It will be understood that the invention is not limited to the embodiment thereof described and illustrated herein, and that various changes and modifications may be effected therein without departing from the scope or spirit of the invention, except as defined in the appended claim.

What I claim is:

In an automotive vehicle having steerable wheels deflectable in opposite directions from a normal centered position in response to rotation of a steering shaft included in a steering control system; the combination of a radial cam secured to the steering shaft and having a periphery that includes a major portion of uniform radius and a single ceratoid cusp constituting the remainder of the periphery, a follower roller engageable with said periphery of the radial cam, the portion of said ceratoid cusp with which said roller comes in contact consisting of two symmetrical arcuate sections which are outwardly convex and meet at the center of the cusp, said sections having radius vectors progressively decreasing throughout their lengths in the direction toward said center of the cusp, means supporting said follower roller for movement in directions extending generally radially with respect to the axis of said cam, and resilient means urging said roller against said periphery of the cam, said cam being angularly disposed with respect to the steering shaft so that, when the steerable wheels are in the normal centered position, the radius of the cam passing through the center of said ceratoid cusp extends through the axis of said roller, whereby any slight deflection of the wheels from the normal centered position thereof tends to urge said roller radially outward against the opposition of said resilient means to give rise to a moment for restoring the wheels to the normal centered position.

References Cited in the file of this patent

UNITED STATES PATENTS

| | | |
|---|---|---|
| 263,287 | Crowley | Aug. 22, 1882 |
| 1,248,014 | Ross | Nov. 27, 1917 |
| 1,249,755 | Holmgren | Dec. 11, 1917 |
| 1,265,522 | Ross | May 7, 1918 |
| 1,418,693 | Bauer | June 6, 1922 |
| 2,182,596 | Olsen | Dec. 5, 1939 |